Nov. 24, 1931.   R. C. PIERCE   1,833,588
MULTIPLE WIRE TENSION DEVICE
Filed Aug. 23, 1930    2 Sheets-Sheet 1

Inventor
Robert C. Pierce.

Nov. 24, 1931.  R. C. PIERCE  1,833,588

MULTIPLE WIRE TENSION DEVICE

Filed Aug. 23, 1930   2 Sheets-Sheet 2

Inventor.
Robert C. Pierce.
By Dyrenforth, Lee, Chritton & Wiles
Attys.

Patented Nov. 24, 1931

1,833,588

UNITED STATES PATENT OFFICE

ROBERT C. PIERCE, OF NILES, MICHIGAN, ASSIGNOR TO NATIONAL-STANDARD COMPANY, OF NILES, MICHIGAN, A CORPORATION OF MICHIGAN

MULTIPLE WIRE TENSION DEVICE

Application filed August 23, 1930. Serial No. 477,403.

This invention relates to improvements in multiple wire tension device and, more especially, such a device particularly adapted for tensioning a plurality of wires as they are fed to a weaving or braiding machine. Such machines, for example, are commonly employed for weaving or braiding wire tapes in the making of reinforcing elements for tire beads. It is desirable to tension each of the wires. In machines as heretofore made, difficulty has been encountered in giving the proper tension to each wire without affecting the tension of other wires. For example, in cases where slotted rollers were provided for the wires, and the grooves were not all exactly of the same circumference, it frequently happened that one or more wires would be fed abnormally fast or unduly slowed.

My improved wire tension device has been designed to overcome the difficulties above referred to.

Other features and advantages of my invention will appear more fully as I proceed with my specification.

In that form of device embodying the features of my invention shown in the accompanying drawings—

Figure 1:
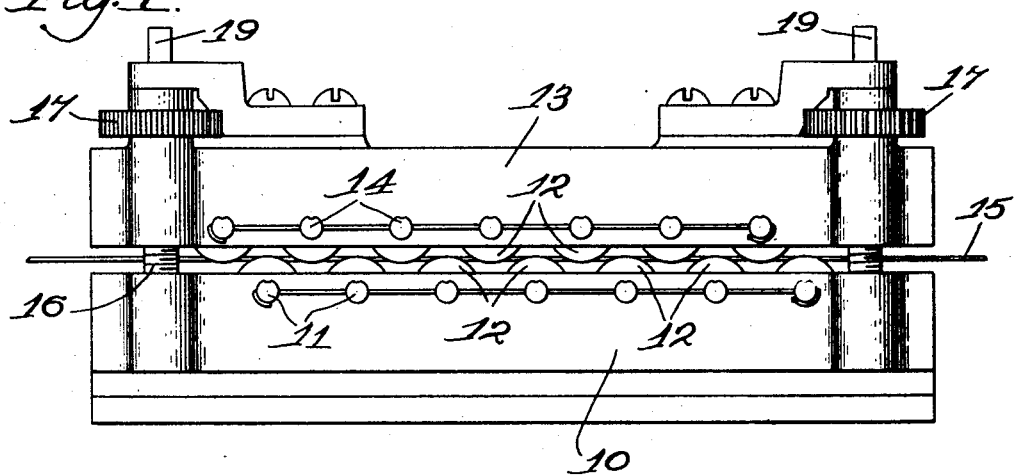
Figure 2:
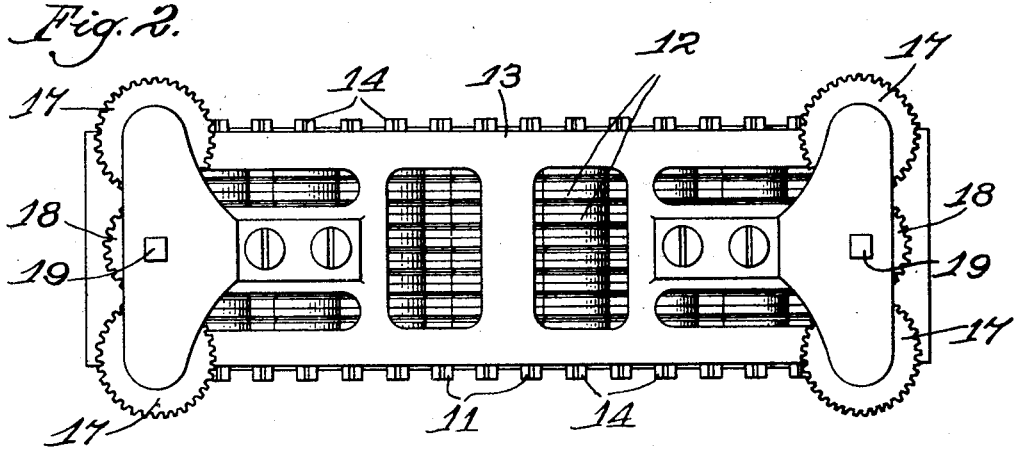
Figure 3:
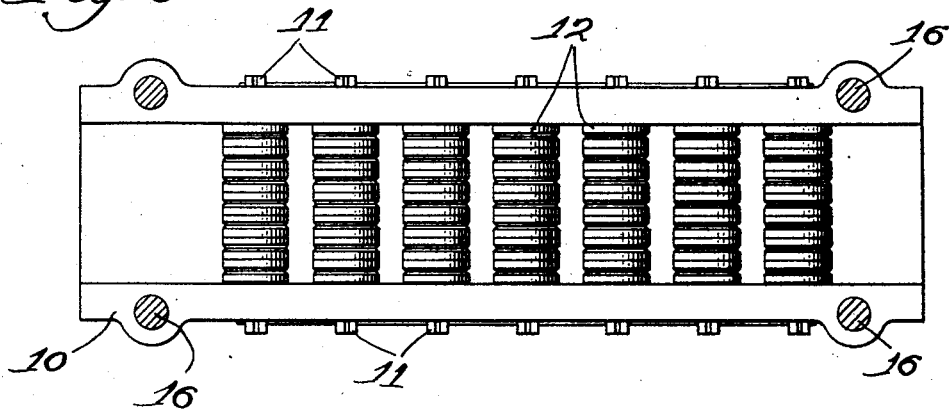
Figure 4:
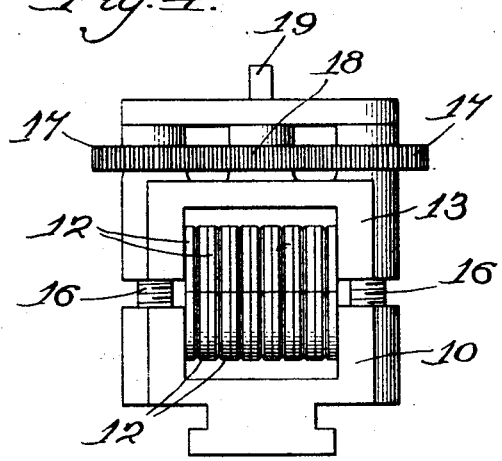

Figure 1 is a view in side elevation; Fig. 2 is a top plan view; Fig. 3 is a horizontal sectional view; Fig. 4 is an end view; and Fig. 5 is a view showing one of the rollers removed.

As shown in the drawings, the device includes a lower support 10 carrying a plurality of the transverse shafts 11, 11, each having a plurality (here shown as seven) of grooved rollers 12 thereon. Numeral 13 indicates a similar upper support carrying a plurality of transverse shafts 14, 14, each having a plurality of similar rollers 12 alined with respect to the rollers on the lower shafts. The shafts 14, 14 are staggered with respect to the shafts 11, 11.

Figure 5:
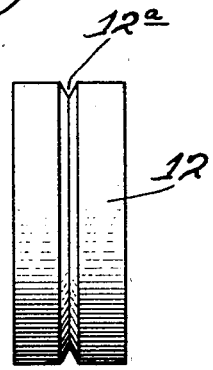

One of the rollers 12 is shown in Fig. 5 removed from the device and it is to be noted that it is provided with an annular V-shaped groove $12^a$ in which the wire 15 lies.

Means are provided for adjusting the supports toward or away from each other, whereby wires passing between the rollers on the upper and lower shafts will be slightly kinked in order to give the desired tension.

It is to be particularly noted that, since the rollers 12, 12 are all separate, the tension on any particular wire will not immediately affect the tension on other wires. That is, if the rollers 12 are not all absolutely uniform in diameter, or if one or more become more or less worn so that certain rollers will rotate faster or slower, such abnormal rotation will not affect the rotation of other rollers and, therefore, cause improper feeding of other wires.

The means for adjusting the supports toward or away from each other are here shown as including four screws 16, 16 at the corners, said screws having their lower ends threaded into the support 10. The upper ends of the screws are rotatably mounted in the support 13. The extreme upper ends of the two screws at each end of the support are provided with gears 17, 17 both engaged by an intermediate gear 18 carrying a squared shaft 19 to receive a wrench for adjusting the same.

Each of the supports 10 and 13 is here shown as comprising a channel member, the transverse shafts 11 or 14 being carried by the flanges thereof, the rollers lying in the recesses.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A multiple wire tension device, including; a lower support carrying a plurality of transverse shafts each having a plurality of grooved rollers thereon; an upper support carrying a plurality of transverse shafts, staggered with respect to the shafts on the lower support, each of said upper shafts having thereon a plurality of grooved rollers alined with the rollers on the lower shafts; and means for adjusting the supports toward or away from each other whereby wires passed between the rollers on the upper and lower shafts will be tensioned as desired.

2. A device as claimed in claim 1, in which each support includes a channel with transverse shafts carried by the flanges, said rollers lying in the recess in said channel.

In witness whereof, I have hereunto set my hand, this 18th day of August, 1930.

ROBERT C. PIERCE.